(12) United States Patent
Ahn et al.

(10) Patent No.: US 10,235,912 B2
(45) Date of Patent: Mar. 19, 2019

(54) IMAGE DISPLAY DEVICE AND METHOD USING UNIDIRECTIONAL BEAM

(71) Applicant: SAMSUNG ELECTRONICS CO., LTD., Suwon-si (KR)

(72) Inventors: Hoyoung Ahn, Suwon-si (KR); Jungwoo Kim, Hwaseong-si (KR); Taeho Kim, Suwon-si (KR); Byounglyong Choi, Seoul (KR); Sungwoo Hwang, Seoul (KR); Sangwon Kim, Seoul (KR); Daeyoung Chung, Suwon-si (KR); Jiyeon Ku, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/311,333

(22) PCT Filed: May 15, 2014

(86) PCT No.: PCT/KR2014/004352
§ 371 (c)(1),
(2) Date: Nov. 15, 2016

(87) PCT Pub. No.: WO2015/174563
PCT Pub. Date: Nov. 19, 2015

(65) Prior Publication Data
US 2017/0116897 A1 Apr. 27, 2017

(51) Int. Cl.
*G06T 3/40* (2006.01)
*G09G 3/00* (2006.01)
(Continued)

(52) U.S. Cl.
CPC ............. *G09G 3/002* (2013.01); *G02B 27/02* (2013.01); *G02B 27/22* (2013.01); *G02C 7/041* (2013.01);
(Continued)

(58) Field of Classification Search
CPC .......... G02C 11/10; G02C 7/04; G02C 7/041; G02B 26/001; G02B 26/02; G02B 26/08;
(Continued)

(56) References Cited

U.S. PATENT DOCUMENTS 5,369,415 A * 11/1994 Richard ............. G02B 27/0172
345/6
5,682,210 A 10/1997 Weirich
(Continued)

FOREIGN PATENT DOCUMENTS

JP 6-121256 A 4/1994
JP 9-305156 A 11/1997
(Continued)

*Primary Examiner* — Diane M Wills
(74) *Attorney, Agent, or Firm* — Sughrue Mion, PLLC

(57) ABSTRACT

An image display device includes an eye wearable lens; a display panel embedded inside the eye wearable lens or arranged on a surface of the eye wearable lens, the display panel comprising an array of a plurality of optical elements for forming an image to be projected onto a retina, wherein a resolution of the image formed by the plurality of optical elements is higher on a central portion of the retina than on a peripheral portion of the retina; and an image signal processor for generating an image signal according to image information which is to be displayed on the display panel and for generating a control signal for controlling each of the plurality of optical elements to be turned on/off according to the image signal.

11 Claims, 7 Drawing Sheets

(51) Int. Cl.
*G02B 27/02* (2006.01)
*G02B 27/22* (2018.01)
*G02C 7/04* (2006.01)
*G06F 3/01* (2006.01)
*G09G 5/391* (2006.01)
*G06F 3/147* (2006.01)
*G06F 1/16* (2006.01)
*G06T 3/00* (2006.01)

(52) U.S. Cl.
CPC .............. *G06F 1/163* (2013.01); *G06F 3/011* (2013.01); *G06F 3/013* (2013.01); *G06F 3/147* (2013.01); *G06T 3/0012* (2013.01); *G06T 3/40* (2013.01); *G09G 5/391* (2013.01); *G02C 7/04* (2013.01); *G09G 2340/0407* (2013.01); *G09G 2354/00* (2013.01)

(58) Field of Classification Search
CPC ............ G02B 26/0808; G02B 26/0816; G02B 26/0875; G06T 3/40; G06F 3/013; G09G 5/391; G09G 2354/00
See application file for complete search history.

(56) References Cited

U.S. PATENT DOCUMENTS

| | | | |
|---|---|---|---|
| 6,175,352 | B1 | 1/2001 | Kay et al. |
| 7,068,813 | B2 | 6/2006 | Lin |
| 7,626,562 | B2 | 12/2009 | Iwasaki |
| 8,096,654 | B2 | 1/2012 | Amirparviz et al. |
| 2002/0113782 | A1 | 8/2002 | Verberne et al. |
| 2009/0189830 | A1* | 7/2009 | Deering ................ G09G 3/02 345/1.3 |
| 2011/0249235 | A1 | 10/2011 | Duis et al. |
| 2012/0050683 | A1* | 3/2012 | Yates ................ A61B 3/1208 351/219 |
| 2012/0140167 | A1* | 6/2012 | Blum ................ A61F 2/1624 351/159.34 |
| 2014/0320547 | A1 | 10/2014 | Lee et al. |

FOREIGN PATENT DOCUMENTS

| | | |
|---|---|---|
| JP | 3957012 B2 | 8/2007 |
| KR | 1020110018202 A | 2/2011 |

* cited by examiner

IMAGE DISPLAY DEVICE AND METHOD USING UNIDIRECTIONAL BEAM

CROSS REFERENCE TO RELATED APPLICATIONS

This is a National Stage application of International Application No. PCT/KR2014/004352 filed May 15, 2014, the contents of all of which are incorporated herein by reference in their entirety.

TECHNICAL FIELD

The present disclosure relates to an image display device using a unidirectional beam.

BACKGROUND ART

An image display device has been widely used in various fields such as advertising, games, healthcare, culture, etc. Recently, the size of pixels in image display devices has been gradually reduced in order to implement a high resolution. The structure of image display devices has been changed in various ways in order to provide a 3-dimensional (3D) image and an augmented reality (AR) image.

When the 3D image or the AR image is implemented, a great amount of data needs to be processed as compared with when a 2D image is implemented. As the resolution is increased, many pixels of a smaller size need to be formed, thus increasing difficulty in manufacturing and driving an image display device, as well as increasing power consumption when in use.

DETAILED DESCRIPTION OF THE INVENTION

Technical Problem

The present disclosure provides an image display device of a structure in which the number of pixels used to display an image is reduced by using a human visual recognition characteristic.

Technical Solution

An image display device comprises an eye wearable lens; a display panel embedded inside the eye wearable lens or arranged on a surface of the eye wearable lens, the display panel comprising an array of a plurality of optical elements for forming an image to be projected onto a retina, wherein a resolution of the image formed by the plurality of optical elements is higher on a central portion of the retina than on a peripheral portion of the retina; and an image signal processor for generating an image signal according to image information which is to be displayed on the display panel and for generating a control signal for controlling each of the plurality of optical elements to be turned on/off according to the image signal.

The plurality of optical elements are arranged such that a distribution density of the optical elements at a central portion of the array is higher than a distribution density of the optical elements at a peripheral portion of the array.

The plurality of optical elements are configured such that a beam spread angle of the plurality of optical elements at a central portion of the array and a beam spread angle of the optical elements at a peripheral portion of the array is different from each other.

The plurality of optical elements are arranged such that an angle formed by an emission surface of the optical element with a lens surface facing the emission surface is greater among the optical elements at a central portion of the array than the optical elements at a peripheral portion of the array.

The image display device further comprises a direction adjusting element adjusting a direction of light emitted from the plurality of optical elements.

The plurality of optical elements are configured such that a size of pixel formed by the optical element at a peripheral portion of the array is greater than a size of pixel formed by the optical element at a central portion of the array.

The image display device further comprises a micro lens reducing a divergence angle of light emitted from the plurality of optical elements.

The micro lens allows the divergence angle of the light emitted from the plurality of optical elements to have a range from $1/60°$ to $1/5°$.

The micro lens has a shape in which only a paraxial region is opened.

Each of the plurality of optical elements comprises: a light emitting structure layer for generating light; and reflectors arranged on a top and bottom of the light emitting structure layer to form a mode to facilitate light generated by the light emitting structure layer to be emitted unidirectionally.

The each of the plurality of optical elements comprises a laser or a resonant cavity light emitting diode (RCLED).

The image display device further comprises a pressure sensor for sensing a motion of an eyeball.

The image signal processor recognizes an eye direction from a signal sensed by the pressure sensor and generates an image signal so that an image, in correspondence with the eye direction, has a high resolution in a central portion of the eye direction and has a low resolution in a peripheral portion of the eye direction.

The image signal processor is implemented in a device separated from the eye wearable lens and wirelessly transmits a signal to the display panel.

An image display method comprises: forming an image to be projected onto a retina of a viewer by using an array of a plurality of optical elements that generate and emit unidirectional light, wherein a resolution of the image is higher on a central portion of the retina than on a peripheral portion of the retina.

The plurality of optical elements are arranged such that a distribution density of the optical elements at a central portion of the array is higher than a distribution density of the optical elements at a peripheral portion of the array.

The plurality of optical elements are arranged such that a beam spread angle of the optical element at a central portion of the array and a beam spread angle of the optical element at a peripheral portion of the array is different from each other.

The plurality of optical elements are configured such that a size of pixel formed by the optical element at a peripheral portion of the array is greater than a size of pixel formed by the optical element at a central portion of the array.

The image display method further comprises: determining an eye direction of the viewer; and generating an image signal such that image corresponding to a central portion of the eye direction has a high resolution and image corresponding to a peripheral portion of the eye direction has a low resolution.

Effects of the Invention

The above-described image display device may form an image by using a unidirectional beam with no diffusion, and may directly irradiate the image onto a retina of a user. Thus, even if the image display device is very close to an eye of the user, the user may recognize the image of the image display device, and thus a display device may be implemented in the form of a contact lens.

The image formed by using the unidirectional beam with no diffusion may be directly irradiated onto the retina, and thus a crystalline lens for recognizing the image may not be adjusted. That is, an image other than the image formed by the above-described image display device may be recognized without interruption, and thus augmented reality (AR) may be easily implemented by utilizing the above-described image display device as an additional image display device.

A pixel layout may be adjusted such that an image is focused at a high density in a retina central portion of a retina and at a relatively low density in a peripheral portion of a retina, and thus the number of pixels necessary for displaying an image may be reduced. Therefore, manufacturing productivity of the image display device may be increased, and power consumption may be reduced when in use.

MODE OF THE INVENTION

Figure 1:
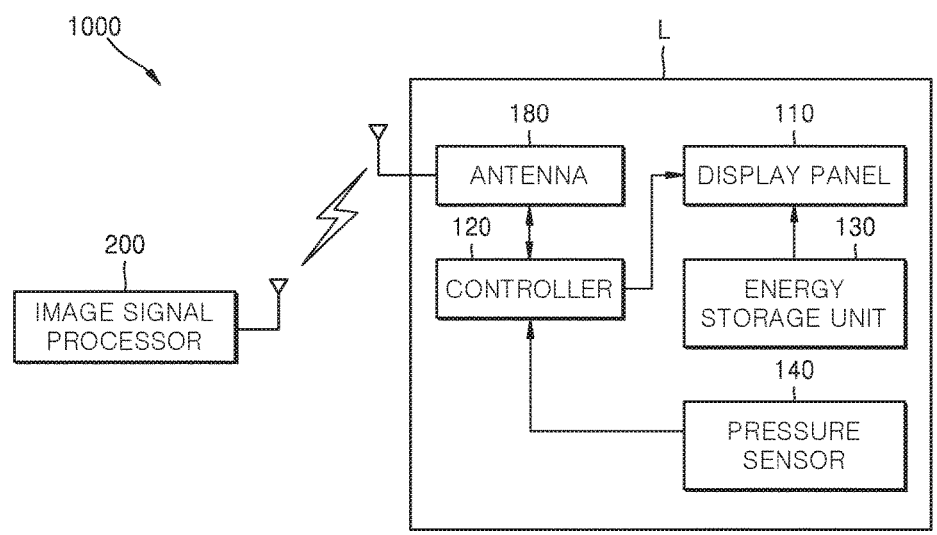
FIG. 1 is a block diagram of a schematic configuration of an image display device according to an embodiment.

The present disclosure will now be described more fully with reference to the accompanying drawings, in which embodiments of the present disclosure are shown. The present disclosure may, however, be embodied in many different forms and should not be construed as being limited to the embodiments set forth herein; rather these embodiments are provided so that this disclosure will be thorough and complete, and will fully convey the concept of the present disclosure to one of ordinary skill in the art.

Reference will now be made in detail to embodiments, examples of which are illustrated in the accompanying drawings, wherein like elements are denoted by like reference numerals and thus a repeated explanation thereof will not be given.

In an image display method according to an embodiment, a method is used by which an image to be projected onto a retina of a viewer is formed by using a plurality of optical elements that generate and emit a unidirectional beam, and a resolution of the image is higher in a central portion of a retina than in a retina peripheral portion of a retina by utilizing a human visual recognition characteristic.

FIG. 1 is a block diagram of a schematic configuration of an image display device 1000 according to an embodiment.

Figure 2:
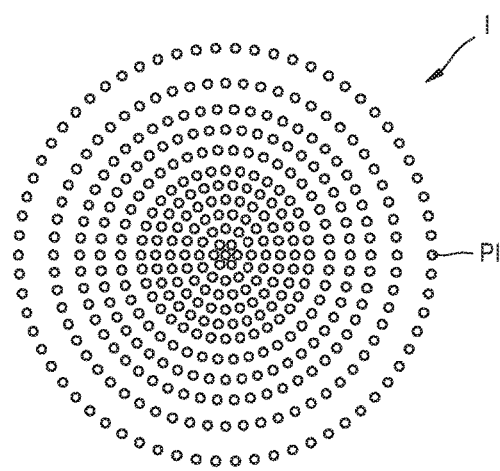
FIG. 2 illustrates an example of a resolution distribution of an image on a retina, the image being formed by a display panel of an image display device according to an embodiment.

FIG. 2 illustrates an example of a resolution distribution of an image I on a retina, the image I being formed by a display panel 110 of the image display device 1000 according to an embodiment.

The image display device 1000 is a display device in a contact lens which can be worn over an eye of a user. The display panel 110 arranged on a lens L has a structure in which an image formed by using a beam with no diffusion may be projected onto a retina of the user. A structure of an optical element that may form the beam with no diffusion will be described below. The display panel 110 has a structure in which the number of pixels necessary for forming an image may be reduced. To this end, the display panel 110 utilizes a human visual recognition characteristic. With regard to the human visual recognition characteristic, cone cells that sense colors are condensed in a visual central portion of the retina and those closer to a visual peripheral portion of the retina have lower density. A small region of the visual central portion of the retina is mapped to a large part of the primary visual cortex to which an optic nerve is connected. This is called cortical magnification. Thus, when an image is formed on the retina, a resolution of the small region in which the optic nerve is condensed is increased, and a resolution of a peripheral region of the small region is reduced, thereby achieving an efficient pixel layout and a structure in which the number of necessary pixels is reduced. The structure of the display panel 110 is determined such that a resolution of the image formed by the display panel 110 on the retina of the user is higher in a retina central portion than in a retina peripheral portion.

As shown in FIG. 2, a distribution of pixel images PI formed on a retina may be formed such that a distribution density of a central portion is higher than a distribution density of a peripheral portion. As described above, a detailed configuration of the display panel 110 for making a resolution of the of pixel images PI formed on the retina higher in the central portion than in the peripheral portion will be described below.

The image display device 1000 includes the display panel 110 having the above-described characteristic and an image signal processor 200 that generates an image signal according to image information to be displayed on the display panel 110 and forms a control signal that controls each of a plurality of optical elements included in the display panel 110 to be turned on/off according to the generated image signal.

The image display device 1000 may further include an antenna 180 for wirelessly receiving the image signal from the image signal processor 200, a controller 120 that controls the display panel 110 according to control information received from the antenna 180, and an energy storage unit 130 that stores energy to be supplied for generating light to each of the plurality of optical elements forming the display panel 110. The energy storage unit 130 may be provided together with an energy collector and may generate energy from the energy collector and provide electrical energy to the display panel 110.

The image display device 1000 may further include a pressure sensor 140 for sensing a motion of an eyeball. The pressure sensor 140 may include a plurality of pressure sensors arranged in each direction along a peripheral portion of the lens L and may sense an eyeball rotation amount from a difference of pressure applied to skin near an eye according to a rotation of the eyeball. An eye direction may be obtained from the eyeball rotation amount sensed by the pressure sensor 140. The image signal processor 200 receives this information and processes the image signal such that a central portion has a high resolution and a peripheral portion has a low resolution with respect to a location of an image corresponding to the eye direction and thus the image is displayed on the display panel 110.

The display panel 110, the antenna 180, the controller 120, the energy storage unit 130, and the pressure sensor 140 are arranged on the lens L. The image signal processor 200 may be implemented in separate equipment spaced apart from the lens L, for example, in a portable mobile device.

Figure 3:
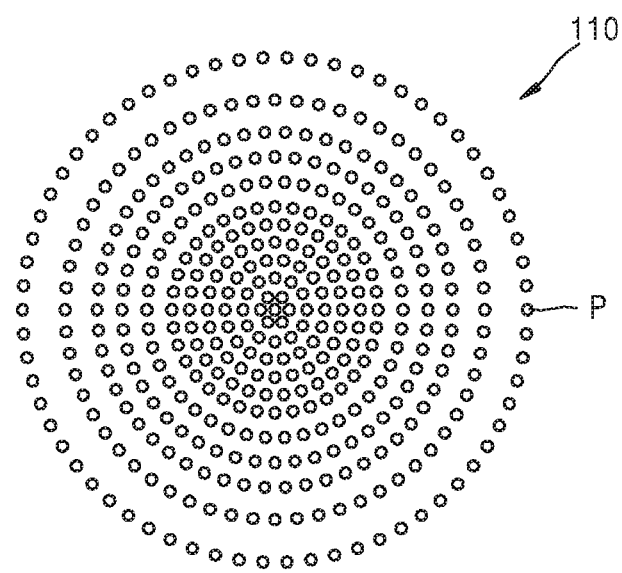
FIG. 3 illustrates a pixel layout of a display panel employed in an image display device according to an embodiment.

FIG. 3 illustrates a pixel layout of the display panel 110 employed in the image display device 1000 according to an embodiment.

The display panel 110 includes an array of a plurality of optical elements P. Each of the plurality of optical elements P is an element that generates and emits a beam with no diffusion. Each of the plurality of optical elements P illuminates a unit region called a pixel. The plurality of optical elements P are arranged such that a distribution density of a central portion of the array is higher than a distribution density of a peripheral portion of the array, i.e., the plurality of optical elements P are more condensed in the central portion than in the peripheral portion. For example, a distribution density may change from the central portion to the peripheral portion. The plurality of optical elements P may be arranged in a concentric circular shape, as drawn in the FIG. 3. As another example, the plurality of optical elements P may be arranged in a polygonal shape.

To decrease a resolution of the peripheral portion, the distribution density of the optical elements P is low in the peripheral portion, and the optical elements P arranged in the peripheral portion may form larger pixels than pixels formed by the optical elements P arranged in the central portion.

Figure 4:
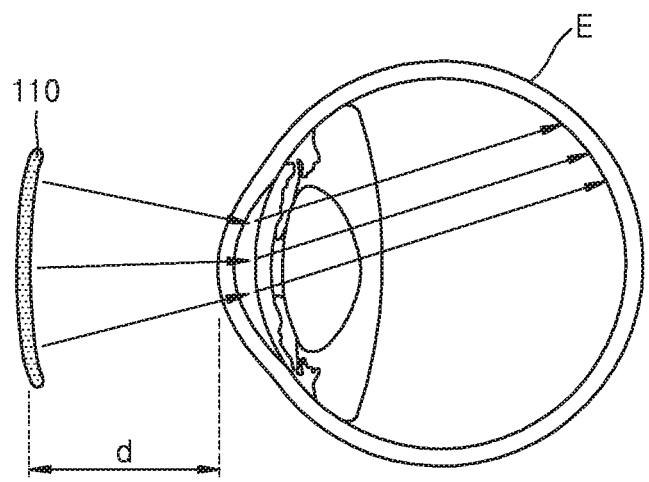
FIG. 4 is a conceptual view for describing that an image display device may form an image recognized by a human eye at a very short distance from the human eye, according to an embodiment.

FIG. 4 is a conceptual view for describing that an image display device may form an image recognized by a human eye at a very short distance from the human eye, according to an embodiment.

From an optical point of view, the eye may form definite images of an object at an infinitely distant location and of an object at a location at a distance of about 10 cm from the eye. Since it is impossible to form an image of an object located closer than this, an auxiliary device is used. However, even if using an optical element such as a lens, it is impossible to provide an image at a close distance of 1 cm or less as the image becomes indefinite due to diffraction and aberration of light. That is, an image formed at a point very close to the eye of a user is difficult to be recognized by the eye by using a general optical system focusing a pencil of light rays.

The display panel 110 employed in the image display device 1000 of the present embodiment generates a unidirectional light with little diffusion, forms an image by using the unidirectional light, and directly emits the image to a retina of a user to allow the user to recognize the image formed on the retina.

In the case of an image formed by using light with no diffusion, the image may be recognized by a human eye at a close distance d at which an image is not normally recognized by the eye by controlling the eye lens, for example, at a distance of about 5 cm or less. Thus, the image display device 1000 may be implemented in the form of a lens that may be worn on the human eye.

Figure 5:
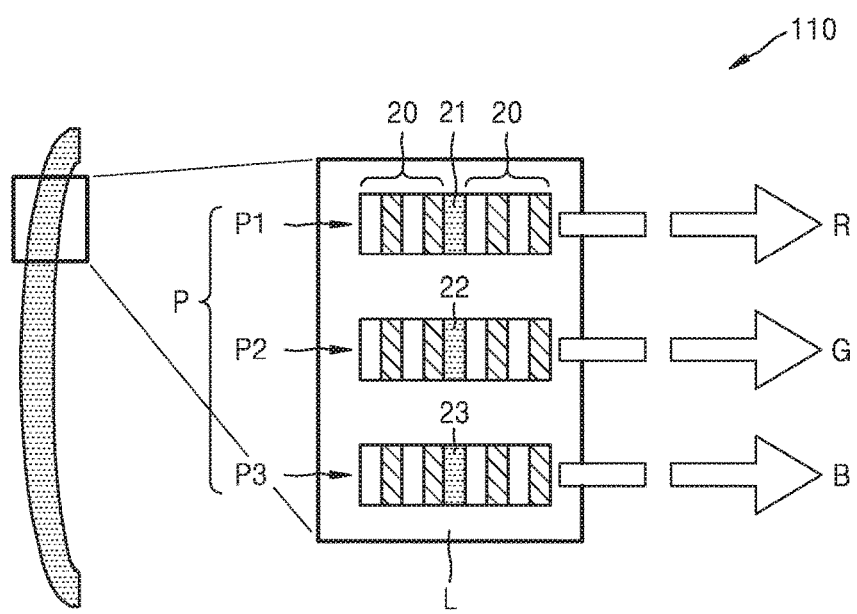
FIG. 5 illustrates a schematic configuration of optical elements that form a beam with no diffusion, which are employed in a display panel of an image display device according to an embodiment.

FIG. 5 illustrates a detailed configuration of the optical elements P forming the display panel 110 of the image display device 1000 according to an embodiment.

The display panel 110 includes optical elements P1, P2, and P3 that generate light of different wavelengths. The optical elements P1, P2, and P3 define sub-pixels of different colors. A plurality of sub-pixels together form a unit pixel. An image may be formed of a combination of lights formed by a plurality of unit pixels. For convenience, FIG. 5 shows only one unit pixel.

The optical elements 121, 122 and 123 are elements that generate and emit unidirectional beams. In the present specification, in describing lights emitted from the display panel 110 or the optical elements P1, P2, and P3, expressions such as beams with no diffusion, straight beams, and unidirectional beams are used while being mixed with one another, all of which have similar meanings. Descriptions such as "with no diffusion", "going straight", and "unidirectional" are not limited to being 100% perfect but are at a degree clearly recognized by a retina of a user with no focus adjustment of the eye lens being necessary.

The display panel 110 may be embedded inside the lens L or may be arranged on a surface of the lens L. In FIG. 5, the plurality of optical elements P1, P2, and P3 forming the display panel 110 are embedded inside the lens L but are not limited thereto. The plurality of optical elements P1, P2, and P3 may be arranged on the surface of the lens L.

The optical elements P1, P2, and P3 include light-emitting structure layers 21, 22, and 23 which generate light and reflectors 20 arranged at the top and bottom of the light emitting structure layers 21, 22, and 23 to form a mode to allow light generated by the light emitting structure layers 21, 22, and 23 to be emitted unidirectionally.

The light emitting structure layers 21, 22, and 23 may be formed of semiconductor layers that generate light by coupling electrons and positive holes and may have a multiple layer structure. For example, the light emitting structure layers 21, 22, and 23 may include n-type semiconductors and p-type semiconductors for injecting electrons and positive holes, respectively, and may also include active layers where the injected electrons and positive holes are combined with one another. Depending on materials that form the light emitting structure layers 21, 22, and 23, wavelength bands of emitted light thereof may be controlled. For example, the materials from which the light emitting structure layers 21, 22, and 23 are formed may respectively facilitate formation of red light R, green light G, and blue light B.

The reflector 20 may be a distributed Bragg reflector DBR where a plurality of dielectric material layers having different dielectric constants are alternately stacked with a certain thickness. The number of layers forming the reflector 20 is not limited to that shown in FIG. 5, but may be appropriately determined by considering reflecting efficiency.

For example, laser or resonant cavity light emitting diodes (RCLEDs) may be used as the optical elements P1, P2, and P3.

Figure 6:
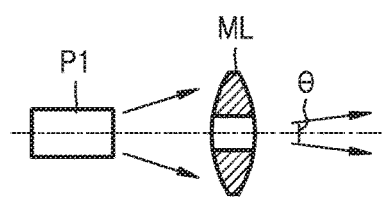
FIG. 6 illustrates a micro lens, employed in the display panel of FIG. 5, for reducing a divergence angle of beams emitted from an optical element.

FIG. 6 illustrates a micro lens ML that may be employed in the display panel 110 of FIG. 5.

If the optical element P1 is configured as described with reference to FIG. 5, an emitted beam may have a small divergence angle. To supplement the small divergence angle, the micro lens ML may be employed. The micro lens ML may function to collimate the beam emitted from the optical element P1. In this regard, since a spherical aberration may occur in a region relatively far from an optical axis, the micro lens ML may be used to open only a paraxial region and shield other regions. The beam collimated by the micro lens ML may have a parallel or very small divergence angle. For example, with respect to a region of a central portion of a retina in which optic nerves are most condensed, 120 optic nerves may be condensed within a range of a viewing angle of about 2° from a surface of an eyeball. Thus, a divergence angle θ of the beam collimated by the micro lens ML may not be less than 1/60°. The micro lens ML may reduce the divergence angle θ of the beam emitted from the optical element P1 to about 1/5°. Although the micro lens ML is used to reduce the beam of the optical element P1 in FIG. 6, the micro lens ML may also be applied to the optical elements P2 and P3.

Figure 7:
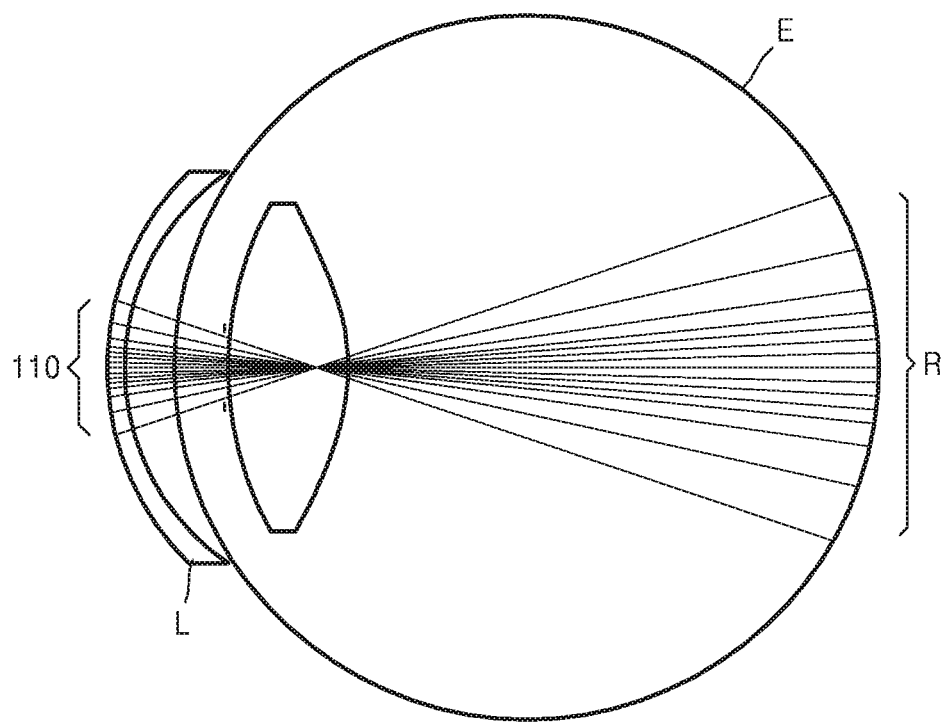
FIG. 7 illustrates an example of a light path through which a display panel of an image display device forms an image on a retina of a viewer, according to an embodiment.

FIG. 7 illustrates an example of a light path through which the display panel 110 of the image display device 1000 forms an image on a retina R of a viewer, according to an embodiment.

By the display panel 110 in which pixels are arranged at a distribution density shown in FIG. 3, the image formed on the retina R has a resolution which is higher in a central portion than a resolution of a peripheral portion, as shown in FIG. 2.

Figure 8:
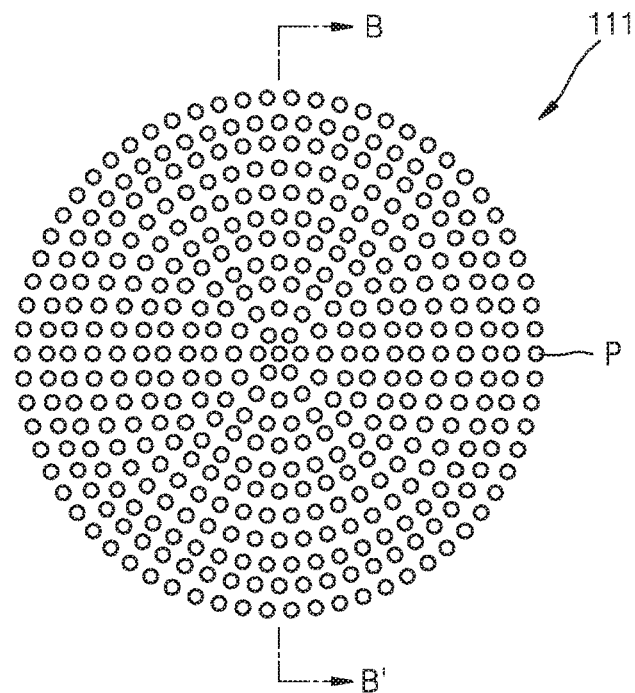
FIGS. 8 and 9 are respectively plan and cross-sectional views of a pixel layout of a display panel of an image display device according to another embodiment.
Figure 9:
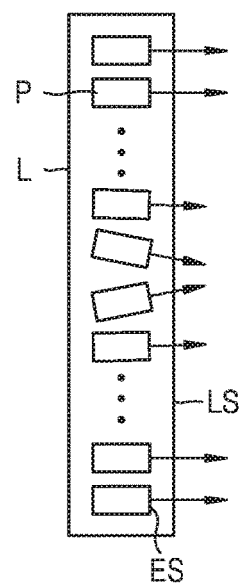

FIGS. 8 and 9 are respectively plan and cross-sectional views of a pixel layout of a display panel 111 of an image display device according to another embodiment.

The optical elements P forming the display panel 111 may be arranged with no difference in a distribution density between a central portion and a peripheral portion. In this case, in order to make a resolution of an image formed on a retina higher in the central portion than in the peripheral portion, the optical elements P arranged in the peripheral portion and the optical elements P arranged in the central portion may be different according to a beam spread angle. For example, as shown in FIG. 9, the optical elements P arranged in the peripheral portion have an emission surface ES facing a lens surface LS, and the lens surface LS and emission surface ES are parallel to each other in the peripheral portion, while an angle formed by the emission surface ES of the optical elements P and the lens surface LS increases closer to the central portion. The lens surface LS is a curved surface, and thus the lens surface LS facing the emission surface ES indicates position at which light emitted from the emission surface ES meets the lens surface LS.

FIG. 9 illustrates a layout of the emission surface ES such that an angle formed by the emission surface ES of each of the optical elements P and the lens surface LS differentiates beam spread angles of the optical elements P arranged in the peripheral portion and the central portion, but this is only an example. This may be implemented in different ways.

Figure 10:
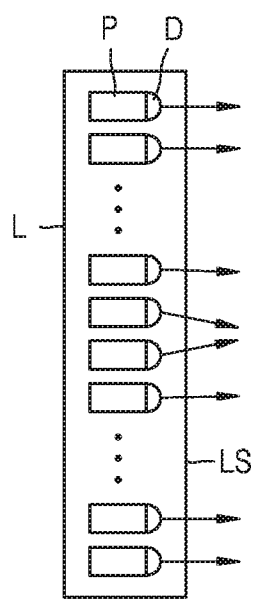
FIG. 10 is a cross-sectional view of a modification example of FIG. 9.

FIG. 10 is a cross-sectional view of a modification example of FIG. 9.

As shown in FIG. 10, each of the optical elements P may have a beam spread angle adjusting element D. The beam spread angle adjusting element D may be used to adjust a beam spread angle of light generated and emitted by the optical elements P, may be in the form of a lens, and may change the beam spread angle of the light emitted by the optical elements P by adjusting a detailed shape of a curved surface. FIG. 10 illustrates the beam spread angle adjusting elements D provided in the optical elements P as having the same shape, but this is an example provided for the purpose of convenience. A detailed shape of the beam spread angle adjusting element D may be determined such that a degree of adjustment of a beam spread angle is different according to locations of the optical elements D, i.e., according to a central portion and a peripheral portion.

Figure 11:
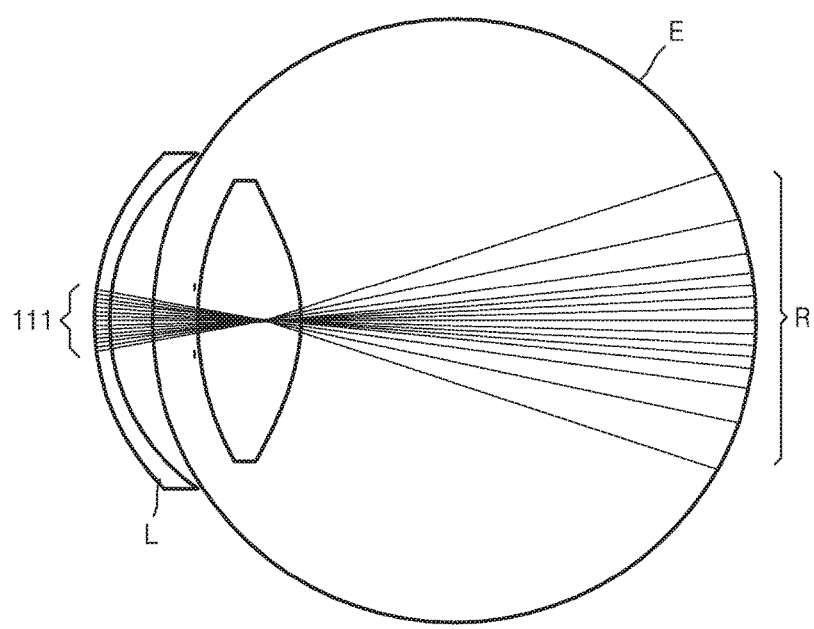
FIG. 11 illustrates an example of a light path through which a display panel of FIGS. 8, 9, and 10 forms an image on a retina of a viewer.

FIG. 11 illustrates an example of a light path through which the display panel 111 of FIGS. 8, 9, and 10 forms an image on the retina R of the viewer.

The optical elements P are arranged at a uniform distribution density in a central portion and a peripheral portion and have different beam spread angles in the central portion and the peripheral portion, and thus an image having a higher resolution in the central portion than in the peripheral portion, for example, the image I having a resolution distribution shown in FIG. 2, may be formed on the retina R.

It should be understood that the example embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image display device comprising:
   an eye wearable lens;
   a display panel embedded inside the eye wearable lens or arranged on a surface of the eye wearable lens, the display panel comprising an array of a plurality of optical elements for forming an image to be projected onto a retina, wherein a resolution of the image formed by the plurality of optical elements is higher on a central portion of the retina than on a peripheral portion of the retina; and
   an image signal processor for generating an image signal according to image information which is to be displayed on the display panel and for generating a control signal for controlling each of the plurality of optical elements to be turned on/off according to the image signal;
   wherein the plurality of optical elements comprises a plurality of optical elements at a central portion of the array and a plurality of optical elements at a peripheral portion of the array;
   wherein a beam spread angle of the plurality of optical elements at the central portion of the array is different from a beam spread angle of the plurality of optical elements at the peripheral portion of the array; and
   wherein angles formed between emission surfaces of the optical elements at the central portion of the array and a lens surface facing the emission surfaces is greater than angles formed between emission surfaces of the optical elements at the peripheral portion of the array and the lens surface facing the emission surfaces.

2. The image display device of claim 1, wherein the plurality of optical elements are arranged such that a distribution density of the optical elements at the central portion of the array is higher than a distribution density of the optical elements at the peripheral portion of the array.

3. The image display device of claim 1, further comprising a direction adjusting element adjusting a direction of light emitted from the plurality of optical elements.

4. The image display device of claim 1, wherein the plurality of optical elements are configured such that a size of pixel formed by an optical element of the optical elements at the peripheral portion of the array is greater than a size of pixel formed by an optical element of the optical elements at the central portion of the array.

5. The image display device of claim 1, wherein each of the plurality of optical elements comprises:
   a light emitting structure layer for generating light; and
   reflectors arranged on a top and bottom of the light emitting structure layer to form a mode to facilitate light generated by the light emitting structure layer to be emitted unidirectionally.

6. The image display device of claim 5, wherein the each of the plurality of optical elements comprises a laser or a resonant cavity light emitting diode (RCLED).

7. The image display device of claim 1, further comprising a pressure sensor for sensing a motion of an eyeball.

8. The image display device of claim 7, wherein the image signal processor recognizes an eye direction from a signal sensed by the pressure sensor and generates an image signal so that an image, in correspondence with the eye direction, has a high resolution in a central portion of the eye direction and has a low resolution in a peripheral portion of the eye direction.

9. The image display device of claim 1, wherein the image signal processor is implemented in a device separated from the eye wearable lens and wirelessly transmits a signal to the display panel.

10. An image display device comprising:
    an eye wearable lens;
    a display panel embedded inside the eye wearable lens or arranged on a surface of the eye wearable lens, the display panel comprising an array of a plurality of optical elements for forming an image to be projected onto a retina, wherein a resolution of the image formed by the plurality of optical elements is higher on a central portion of the retina than on a peripheral portion of the retina;
    an image signal processor for generating an image signal according to image information which is to be displayed on the display panel and for generating a control signal for controlling each of the plurality of optical elements to be turned on/off according to the image signal; and
    a micro lens reducing a divergence angle of light emitted from the plurality of optical elements;
    wherein the micro lens allows the divergence angle of the light emitted from the plurality of optical elements to have a range from $1/60°$ to $1/5°$.

11. An image display device comprising:
    an eye wearable lens;
    a display panel embedded inside the eye wearable lens or arranged on a surface of the eye wearable lens, the display panel comprising an array of a plurality of optical elements for forming an image to be projected onto a retina, wherein a resolution of the image formed by the plurality of optical elements is higher on a central portion of the retina than on a peripheral portion of the retina;
    an image signal processor for generating an image signal according to image information which is to be displayed on the display panel and for generating a control signal for controlling each of the plurality of optical elements to be turned on/off according to the image signal; and
    a micro lens reducing a divergence angle of light emitted from the plurality of optical elements;
    wherein the micro lens has a shape in which only a paraxial region is opened.

\* \* \* \* \*